Patented Aug. 21, 1945

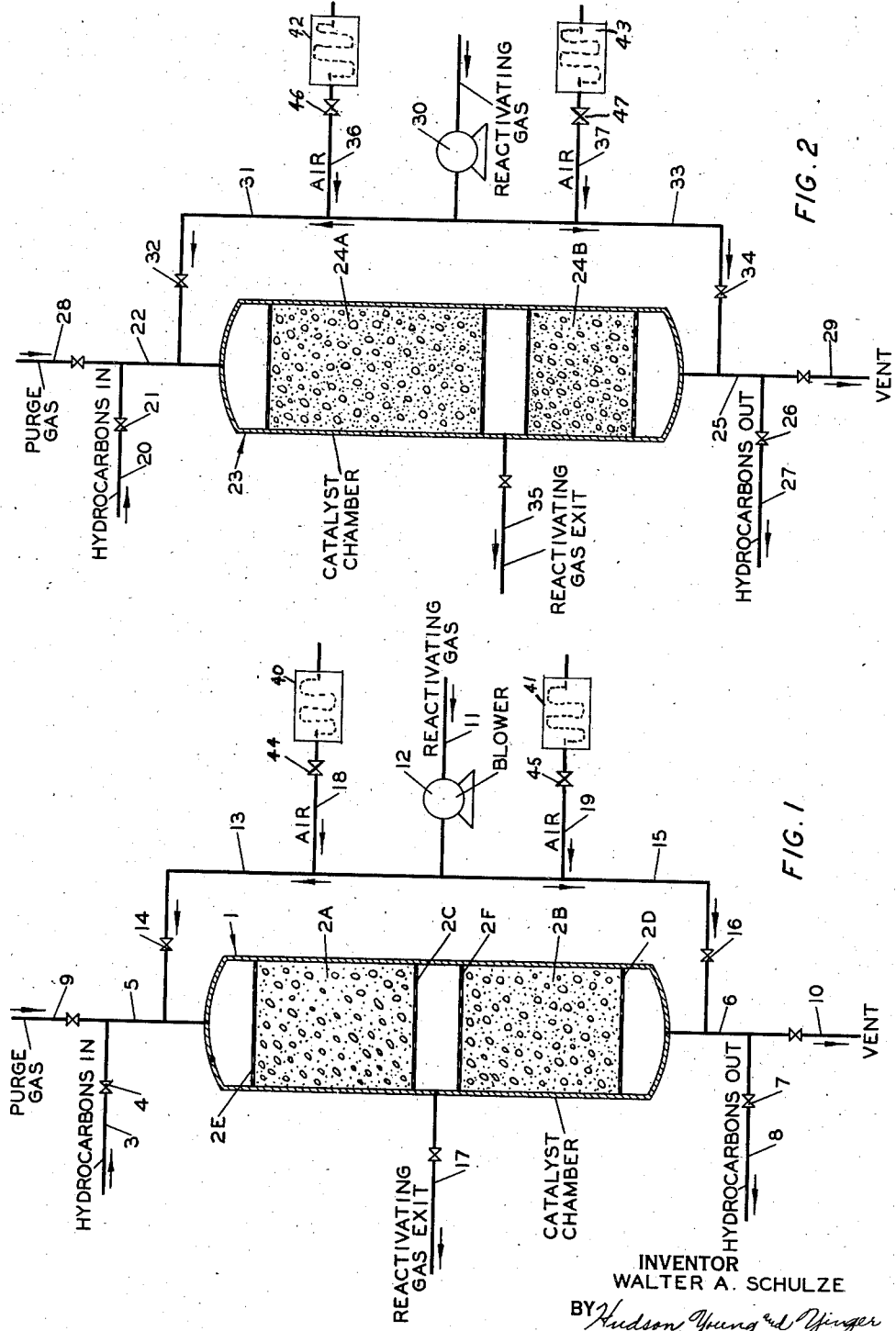

2,383,218

UNITED STATES PATENT OFFICE 2,383,218

HYDROCARBON CONVERSION

Walter A. Schulze, Bartlesville, Okla., assignor to Phillips Petroleum Company, a corporation of Delaware Application February 10, 1942, Serial No. 430,277

6 Claims. (Cl. 196—52)

This invention relates to the catalytic conversion of hydrocarbons at elevated temperatures and in contact with stationary catalyst masses. More specifically, this invention relates to continuous conversion processes wherein the activity of individual units of the catalyst is periodically restored by reactivation in situ. The specific means of accomplishing reactivation is the passage of oxygen-containing gases through said units of catalyst to effect combustion of the carbonaceous deposits responsible for deactivation.

In such catalytic conversions of hydrocarbons as cracking, reforming, dehydrogenation, and the like, I have found that the design and shape of the catalysts bed is of primary importance and must be considered in connection with two operations of dissimilar chemical, mechanical and economic characteristics. The first is the processing operation in which the critical factors are those affecting the extent and selectivity of endothermic hydrocarbon conversion. The second is the reactivation operation which is strongly exothermic and difficult to control but which for economic reasons must be performed as rapidly as possible in order to lengthen the productive and curtail the non-productive periods of catalyst service.

For the processing period, the optimum combination of contact time and linear hydrocarbon vapor velocity usually requires a relatively narrow and deep catalyst bed. By this design the convertive reactions are promoted by relatively long contact of hydrocarbons with the catalyst, but with enough vapor velocity to suppress side reactions and to prevent retention of polymers and the like on the catalyst particles. The design evolved in accordance with these principles is an elongated vessel of relatively restricted diameter compared to the depth, offering an extended contact within the catalyst space even at relatively high linear vapor velocity.

When a catalyst bed in a vessel of this design is reactivated, the carbonaceous residues are burned off by a highly exothermic combustion which requires the passage therethrough of a gas mixture of such volume and oxygen content that combustion temperatures will not result in catalyst deterioration. On the usual stoichiometric basis, the amount of carbon to be burned governs the oxygen required and hence the volume of oxygen-containing gas to be supplied. With the oxygen content of the reactivation gas effectively limited by the rate at which heat of combustion can be dissipated by the gas stream, the time required for reactivation is dependent on the rate at which said reactivating gas can be forced through the catalyst bed. When the reactivation period is made as short as possible in order to increase the on-stream time, the total volume of reactivating gas per volume of catalyst to be put through a catalyst bed becomes enormous.

In most instances, the required rates of flow of reactivating gas so far exceed the maximum values used in the processing period that design figures based on the latter operation alone are not satisfactory. This disparity of requirements for the two operations may be appreciated when the actual vapor velocities are compared. Thus, the processing period of a catalytic cracking process may involve space velocities of 500 to 1500 gas volumes per hour, while reactivation of the catalyst in a corresponding time period may require space velocities of reactivating gas in the range of 3000 to 10,000 gas volumes per hour. When these latter velocities are employed within a catalyst vessel designed solely on the basis of the processing operation, prohibitive pressure drops and mechanical difficulties may be encountered.

Since alteration of the catalyst bed dimensions automatically affects the hydrocarbon conversion and the capacity in terms of hydrocarbon throughput, the limitations imposed by the reactivation operation are often detrimental to process efficiency. Obvious expedients such as reduction of the depth or increase in the bed diameter all lead away from optimum conversion conditions. Similarly lengthening the reactivation period in order to use lower reactivation gas flow rates reduces the on-stream service of each catalyst unit and sacrifices process efficiency to the requirements of a substantially non-productive operation.

The principal object of the present invention is to provide an improved method for the catalytic conversion of hydrocarbons with periodic reactivation of catalyst. Another object is to provide an improved method for the regeneration in situ of catalyst laden with combustible material from the conversion of hydrocarbons. Numerous other objects will appear hereinafter from a consideration of the following illustrative description taken in conjunction with the accompanying drawing wherein:

Fig. 1 represents diagrammatically, with the catalyst chamber in section, one form of apparatus suitable for use in carrying out the present invention. In this embodiment the two catalysts beds are equal in depth, volume, and physical and chemical characteristics, and Fig. 2 is a similar view of a modified form of apparatus employing catalyst beds of unequal depth and volume.

In accordance with my invention, the catalyst is arranged in a plurality of vertically spaced separate sections or beds, each supported by a foraminous member disposed a substantial distance above the top of the next lower section. Usually the number of sections or beds in a catalyst chamber is two. When on-stream, the hydrocarbon is passed through the total depth of catalyst, i. e., through the sections in series until conversion becomes uneconomic due to the deposition of combustible (carbonaceous) material on the catalyst. Thereupon the converter is taken off-stream and placed on regeneration. In regeneration in accordance with my invention, two independent streams of regenerating gas, independently controlled as to amount, flow rate, temperature and oxygen content, are introduced simultaneously to the ends of the converter and the effluent regeneration gases are withdrawn from a point between the two sections of catalyst, through a suitable conduit.

In my invention the gases passing through the catalyst chamber in contact with the catalyst are substantially (and usually entirely) the sole heat transfer medium. That is, the infed hydrocarbon vapor (plus a heat carrier, if used, such as steam) is the sole heat transfer medium during on-stream operation. And the regenerating gases are the sole heat transfer medium during regeneration. Thus the necessity for using an extraneous heat exchange fluid and system for conducting the same through the bed to control temperature therein is avoided. Such a method of temperature control is very expensive and increases the size of the catalyst case unduly. With my invention no such elaborate precautions are necessary.

In accordance with my invention, I pass from about 4 to about 24 liquid volumes of hydrocarbon per volume of catalyst through the catalyst beds during the on-stream period before regeneration is begun. Thus the capacity of a plant embodying the principles of my invention is very large for a given size and investment.

In a preferred embodiment of the present invention the two sections of catalyst are of a depth selected on a basis designed to give approximately equal weights of carbon deposition therein during the on-stream period. As before, the conversion of hydrocarbons through the total depth of catalyst is followed by regeneration by parallel flow through the two sections so selected, the regenerating gases being admitted to the ends and vented through a common exit between the sections.

Desirably, when using two sections of such depth as to give substantial equal carbon deposition, regeneration is effected by using a higher space velocity of regeneration gases through the section having the higher carbon concentration, i. e., the smaller section. The advantage of this mode of operation is that the smaller section receives gas at a higher space velocity and can thus tolerate a higher oxygen content and faster combustion than if lower space velocities were employed. Equal volumes of gas in the streams to each end of the catalyst chamber may automatically institute this effect when the two catalyst sections are of unequal size. The effect can be magnified by manipulation of the gas volume.

Also it is desirable to regenerate by passing a regenerating gas of higher oxygen concentration through the section of smaller carbon concentration, i. e., the larger section. The larger section with lower carbon concentration may tolerate a higher oxygen content to give a rate of combustion and burning out time equivalent to that of the smaller section.

Furthermore, in accordance with my invention conversion may be through the total depth of catalyst in the converter followed by parallel regeneration in the sections using conditions such that the linear gas velocity is substantially the same as in the conversion step while the space velocity in each section (gas volumes per volume of catalyst per unit of time) is substantially greater than in the conversion step. Under these conditions regeneration may be effected in a period appreciably shorter than when the regeneration gas passes through the total depth of catalyst.

The concept and the benefits of conversion through the total depth of catalyst followed by parallel regeneration through two sections of the catalyst of less than the total depth with substantially equal burning times, the depths of the two sections being so selected as to give substantially equal carbon depositions therein, have not been recorded heretofore. Preferably this result is attained by controlling the space velocity of the regeneration gas so as to be higher in the section having higher carbon concentration, its oxygen content so as to be higher in the section having lower carbon concentration, its linear gas velocity so as to be substantially the same as in the conversion step and its space velocity substantially higher, and otherwise controlling its temperature, volume, and rate of flow so as to give approximately equal regeneration times which are much less than the time which would be required in an overall regeneration procedure wherein the total volume of regenerating gas is introduced at a single point and passes through the entire depth of catalyst.

My invention gives rise to a number of advantages. Among these are simplicity, lower investment, lower cost of operation, better control of temperature during regeneration, greater overall conversion for a given investment and plant size, lower pressure drop, lower cost of equipment for circulating regeneration gas, much less danger of injury to catalyst due to excessive temperature rise or local overheating during regeneration, and shorter overall regeneration time. I obtain a positive and controlled gas flow through the sections of the catalyst without undue complexity or necessity for valves between sections—in practice an almost unattainable arrangement due to difficulties in mechanical construction and in operation due to heat losses, difficulty of finding suitable materials of construction, uncertain operation, complexity, imperfect closure, difficulty of opening and closing, resistance to flow when on-stream, etc. My invention provides, moreover, the only satisfactory arrangement whereby an upflow gas stream can be employed in regeneration without a "chimney" effect which gives non-uniform reactivation. This is due to the cushion effect or back pressure of the opposing downflow regeneration gas stream. Furthermore, the invention provides the advantages inherent in the use of different oxygen concentrations and different volumes in the gas streams to the opposite ends of a catalyst chamber with venting at the middle.

I have now discovered a method of operation of a catalyst vessel and arrangement of the catalyst bed therein which fulfills the requirements of both the processing and reactivation operations without diminishing the efficiency of either step. By my improved method of operation, desirable conditions are obtained for each operation with greatly increased efficiency and operating economy, particularly with regard to decreasing the time required for reactivation.

In its broad aspects, my process contemplates the utilization of a catalyst chamber of extended depth compared to the cross-sectional area, the catalyst being disposed therein in a number of vertically-disposed separate sections or beds, each supported by a suitable permeable plate and/or screen at a distance above the top of the next lower section. This arrangement provides a free space of varying volume between the sections of the bed, and suitable vapor outlet lines are provided opposite at least one free space as described hereinafter.

One specific embodiment of my process utilizes an arrangement of catalyst and equipment as illustrated in Figure 1. This diagram shows a catalyst chamber 1 in which the catalyst is disposed in separate sections 2A and 2B. The flow of hydrocarbon vapors during the processing period is through the sections in series, entering through line 3, valve 4 and line 5 at the top of the chamber, and exiting through line 6, valve 7 and line 8 to plant processing equipment not shown. The total depth of the catalyst bed is chosen to provide optimum contact time during conversion, and to conform to the allowable pressure drop permitted by the operating pressures on the process stream. The beds 2A and 2B are supported by foraminous members 2C and 2D respectively. Dislocation of the beds upwardly may be prevented by foraminous member 2E and 2F respectively, over the top of and confining the catalyst beds therebetween and the lower supporting members. The flow of air through these said lines 18 and 19 is controlled by the valves 44 and 45, respectively, while the temperature thereof is controlled by the respective heating means 40 and 41.

At the end of the processing period, hydrocarbons are purged from the catalyst chamber by means of steam or other inert gas introduced through line 9 and vented either through valve 7 and line 8 to recover the hydrocarbons or directly through line 10. The reactivation is then carried out by means of a gas of suitable oxygen concentration admitted by line 11 and passed by blower 12 in a split stream through line 13 and valve 14 to the top of the chamber, and through line 15 and valve 16 to the bottom of the chamber. The reactivating gas streams then pass from each end of the catalyst chamber to the middle and exit through the common exit line 17. When recirculation of combustion gas is employed, the gas leaving via line 17 may be returned by suitable lines, coolers, filters and the like (not shown) to line 11. After reactivation is completed and before hydrocarbon vapors are admitted to the catalyst chamber, oxygen-containing gases are purged from the chamber by means of steam or inert gas by the same means 9 used for purging prior to reactivation.

Air to furnish oxygen for the reactivation may be mixed into the reactivating gas stream ahead of the blower 12, and/or air may be added to the separate streams as desired through lines 18 and 19 from a source not shown. The flow of reactivating gas to each catalyst section is regulated by means of valves 14 and 16 so that the volume and velocity of gas passing through sections 2A and 2B is regulated to conform to process requirements as described hereinafter. Similarly, the oxygen concentration in the gas to each section may be independently controlled according to the amount of carbonaceous matter to be removed from each section, the time allotted to reactivation and the volume of reactivating gas to be employed.

The arrangement illustrated involves the passage of reactivating gas downward through one section of the catalyst bed and upward through the other so that combustion proceeds from the ends of the chamber toward the centrally-located gas outlet. I have noted that the cushioning effect of the gas streams meeting at the free space between the catalyst bed sections effectively reduces any tendency toward lifting or disarranging the section of the bed through which the high velocity upward flow is maintained, and the reactivating combustion is thus satisfactorily uniform and complete. Foraminous member 2F further aids in preventing such dislocation of bed 2B.

Since in the reactivating combustion the combustion gas stream is both the source of oxygen and the sole heat transfer medium within the bed, the oxygen concentration and the gas velocity are chosen to correspond to the weight of carbonaceous matter to be burned and the time allotted for combustion. The rate of combustion is directly proportional to the amount of oxygen furnished, and more rapid reactivation may be obtained by the use of higher oxygen concentrations. However, the necessity for regulating the temperature rise within the catalyst, and the relatively low heat capacity of the combustion gases ordinarily demand the use of low oxygen concentration during the major portion of the combustion period, and high gas rates are therefore desirable. The limiting factor in the direction of higher reactivating gas rates is the increasing pressure drop with increasing linear gas velocity.

The evaluation of factors governing gas flow through solid granular catalyst has established the following approximate relationships:

(1) $\quad \Delta p \propto d$
(2) $\quad \Delta p \propto v^{1.8}$ whereas $\Delta p$ is the pressure drop through the catalyst bed, $d$ is the bed depth and $v$ is the linear gas velocity. These relationships are calculated on the basis of solid granular catalysts with an apparent void space of 30 to 50 per cent, and show that the factors governing pressure drop are linear gas velocity, and the bed depth, with the former of far greater significance.

From the foregoing relationships and from experimental measurements, I have established that catalyst beds of optimum depth and volume for the hydrocarbon conversion may be satisfactorily reactivated by my new process without encountering prohibitive pressure drop during the passage of reactivating gas. By my process, which provides for parallel flow through the catalyst bed sections during reactivation, the desired space velocity and total throughput of reactivating gas can be obtained at reduced linear velocity through the catalyst due to the division of the gas stream. Conversely, when a critical or maximum linear velocity is imposed by the available means for gas circulation, the increased space velocity of reactivating gas made possible by my process enables more rapid reactivation. Also, since the depth of the bed traversed by each gas stream is shorter, both the factors of the above-listed relationships are reduced, and the pressure drop is correspondingly reduced. This benefit is reflected, according to process requirements, in shortened reactivation time, better temperature control and generally lowered operating costs. By shortening the reactivation time the capacity of a given size plant is increased, or for the same capacity, the size may be reduced.

A further advantage of my process lies in the essentially independent control provided for reactivation of the sections of the catalyst bed. In the catalytic conversion of hydrocarbons, a variety of reactions may occur to a greater or lesser extent as the composition of the vapors in contact with the catalyst changes. Thus, for example, in a conversion producing increased unsaturation in a hydrocarbon stock, the concentration of unsaturates in the vapor stream increases with the passage of the vapors through the catalyst bed, and polymer, tar and/or coke formation often occurs to the greatest extent in the portion of the bed nearer the exit port. This inequality in the distribution of carbonaceous deposits permits several operating arrangements according to my process which improve control of the temperatures and time of reactivation.

One such arrangement is illustrated in Figure 2 which represents the disposition of the catalyst for a process wherein the carbon deposits are substantially higher in the section of the catalyst bed adjacent to the exit port. The diagram shows the hydrocarbon vapor flow through line 20, valve 21, line 22 and through catalyst chamber 23 containing separate beds of catalyst 24A and 24B with the section nearer the inlet port of substantially greater depth and volume than the section nearer the exit port. After series flow through the catalyst beds, the hydrocarbons exit through line 25, valve 26 and line 27 to further processing equipment.

Prior to reactivation, the catalyst bed is purged of hydrocarbon vapors by the passage of a purge gas through line 28, line 22, chamber 23 and out through line 25, and vent line 29. For the reactivation, oxygen-containing gas is passed by means of blower 30 through line 31 and valve 32 to one end of the chamber and through line 33 and valve 34 to the opposite end. The two streams of combustion gas after passage through catalyst bed sections 24A and 24B respectively, exit through line 35 and may either be vented or recycled to the blower 30. The reactivating gas may contain a regulated oxygen content and/or air may be added to the separate streams through lines 36 and 37 as desired. The flow air through these said lines 36 and 37 is controlled by the valves 46 and 47, respectively, while the temperature thereof is controlled by the respective heating means 42 and 43.

The relative depth and volume of beds 24A and 24B are ordinarily chosen to represent approximately equal weights of combustible deposits so that the burning times in each section will correspond. However, since the concentration of combustible material is different in the two sections, the oxygen content of the gas stream to each may be different, and the space velocity of combustion gases to each section may be correspondingly regulated to control the maximum temperature and the reactivation time.

For example, considering the section 24B to contain a higher concentration of carbonaceous material and a smaller volume of catalyst, when equal volumes of gas are admitted to the catalyst chamber through valves 32 and 34, the space velocity in cubic feet of gas (STP) per hour per volume of catalyst through section 24B is higher than in section 24A, and a higher rate of combustion may be practised without exceeding maximum allowable temperatures. Also, each of the volume, the temperature, and the oxygen content of the gas stream passing through section 24B may be adjusted independently of the reactivation in the other section. A still further advantage of this arrangement lies in the flexibility and speed afforded for the secondary stages of reactivation during which the final traces of carbon are burned off. Thus, higher oxygen concentrations may be furnished to one section to maintain combustion and speed up the reactivation, even while primary combustion is proceeding with low oxygen concentrations in the other section. This eliminates the period of substantially interrupted combustion in portions of the catalyst bed while waiting for the primary combustion zone or hot front to pass through the entire bed. Consequently the reactivation can be carried out much more rapidly using my invention than when using prior processes.

Obviously many modifications of the equipment illustrated in the drawing are possible in accordance with the conditions and requirements of particular conversion. Thus, the hydrocarbon flow through the catalyst may in some cases be reversed, and the catalyst bed sections correspondingly arranged or divided. Also, in some instances, the concentration of carbonaceous deposits may be different from that indicated above, and the relative depth of the catalyst bed sections may be varied and the relative dimensions reversed. For example, in cracking stocks such as waxy, unrefined recycle gas oil and the like, the catalyst may accumulate, more or less mechanically, heavy carbonaceous deposits in the increment first contacted by the hydrocarbons. In such a case, the ratio of the depths of the sections of the bed might be the reverse of that shown in Figure 2.

In order that the operation and advantages of my process may be more fully understood, the following exemplary operations are provided. However, since the principles disclosed are of wide application, the examples are not to be construed as limiting the scope of the invention.

Example I

In a catalytic gas oil cracking process utilizing an alumina-type catalyst, the catalyst chambers used were twelve feet long and four feet in diameter. Each chamber contained two sections of catalyst each five feet deep, with free space of one foot at the center. Opposite this free space, a vapor line was provided for exit of combustion gas during reactivation as shown in Figure 1.

During the processing period of two hours, gas oil vapor was cracked at 950° F. with series flow through both sections of the catalyst and with the deposition of 3 weight per cent of carbon, based on the charge. At the end of the processing period, hydrocarbons were purged from the catalyst chamber with steam, and subsequently reactivating gas containing 3 volume per cent of oxygen was furnished in separate streams to each section of the catalyst bed with the combined effluents removed at the center outlet. In order to reactivate the entire bed in three hours, 3000 cubic feet of gas per minute was passed through each section of the catalyst bed, which corresponded to a linear velocity calculated on the empty chamber shell of 4.0 feet per second. With the outlet line made of sufficiently large diameter to avoid excessive pressure drop, the pressure drop through each five foot section of the catalyst bed was between nine and eleven pounds in each section. The gas entered at about 850°

F. and left the chamber during the primary combustion period at about 1350° F.

With this arrangement of a two hour processing period and a three hour reactivation period, five catalyst chambers were operated so as to have two on-stream and three undergoing reactivation, or a total of 48 chamber-hours on-stream and 72 chamber-hours in reactivation during each 24-hour day.

When a catalyst bed of the same total depth and the same diameter was employed in an identical conversion, but with reactivation conducted by passage of the reactivating gas through the whole bed, four hours were required for reactivation. The longer time requirement was caused by both the higher linear gas velocity of the total gas stream passing through the entire bed and the doubled bed depth. Even with a four hour reactivation period, the linear velocity of reactivating gas was about 5.7 feet per second, based on the empty chamber shell. Under these conditions, much higher pressure drop resulted. Also, with each catalyst chamber on-stream two hours and off-stream four hours, six chambers were required to give on-stream time equal to that furnished by five chambers designed and operated according to the present invention with two catalyst sections in parallel flow during reactivation.

*Example II*

In a catalytic cracking operation utilizing a clean gas oil charge and a refractory diluent as a heat carrier, the catalyst chambers were charged with silica-alumina catalyst in two vertically-disposed beds or sections in a chamber four feet in diameter and twelve feet long. The arrangement was as in Fig. 2. The section first contacted by the hydrocarbons was six feet deep, while the second section was three feet deep with a free space of one foot between the sections and a space of one foot at each end of the converter. The carbon deposition during a two-hour conversion period at 975° F. was as follows, measured at on-foot increments through the sections in series:

| Distance in feet from top of section | | Wt. per cent carbon |
|---|---|---|
| First section | 1 | 1.0 |
| | 2 | 0.5 |
| | 3 | 1.0 |
| | 4 | 2.0 |
| | 5 | 2.0 |
| | 6 | 4.0 |
| Second section | 1 | 5.0 |
| | 2 | 6.0 |
| | 3 | 5.0 |

The average carbon deposition for the entire catalyst bed was 3.4 weight per cent, with approximately equal weights of carbon in each section, although the section first contacted with hydrocarbons was twice the depth of the second section in the series.

In reactivating the catalyst bed equal volumes of reactivating gas were supplied to each section as shown in Figure 2, with the result that the space velocity through the second section was twice that through the upper section. The higher concentration of carbon in the second section was burned off satisfactorily with a gas containing 3 volume per cent of oxygen, while the gas passed through the first section contained 4 to 5 volume per cent oxygen. Reactivation time was the same for each section, and the total time required was three hours. In contrast, when the reactivation gas passed through both sections in series, four hours were required for reactivation using a gas containing 3 volume per cent of oxygen.

The following example shows a modification of my invention enabling a reactivation period much shorter than the conversion period, a very important point, not previously exemplified.

*Example III*

In a gas oil cracking process utilizing bauxite catalyst, the chambers were constructed as described in Example I. Each chamber contained two five-foot sections of 6 to 14 mesh bauxite, or a total of about 125 cubic feet of catalyst, weighing approximately 7000 pounds. The gas oil charge was admixed with 25 weight per cent of steam and the mixture was treated at a flow rate of one liquid volume of oil per hour per volume of catalyst and a pressure of 75 pounds gage. The vapor stream passed through the catalyst bed sections in series at an average temperature of 965° F.

The rate of carbon deposition was approximately one per cent by weight of the oil charged and in the conversion period of four hours the total carbon deposit amounted to about 3.8 per cent by weight of the catalyst. At the end of the conversion period the catalyst was purged with steam, and oxygen-containing gas was admitted in separate streams to each end of the chamber and vented at the center.

In order to complete reactivation in three hours with gas containing an average of 3 volume per cent of oxygen, the gas was furnished at a total flow rate of 1500 cubic feet (STP) per hour per pound of carbon at an inlet temperature of 850° F. and an outlet temperature averaging 1350° F. The total gas flow was about 400,000 cubic feet per hour, with about half passing to each end of the catalyst chamber. The linear gas velocity in each section at about 30 pounds gage pressure was about 4.4 feet per second, calculated on the empty shell, and with a section depth of only five feet, a moderate pressure drop of about 10 pounds was encountered. With this schedule of a four-hour conversion period and a three-hour reactivation period, the on-stream service of each chamber was about 57 per cent of the over-all cycle time.

When reactivation was undertaken in the same catalyst chamber after an identical conversion period, but with the reactivation gas passing in a single stream through the total depth of catalyst, the three-hour reactivation period was not feasible. This resulted from the doubling of the linear gas velocity and the bed depth so that the pressure drop was about eight times that encountered in the above-described parallel flow. In order to avoid this excessive pressure drop and to restore the linear gas velocity to the range obtained with parallel flow, a six-hour period was employed with a somewhat higher pressure drop due to the greater depth of catalyst.

With each chamber on-stream four hours and off-stream six hours, the on-stream service was only 40 per cent of the over-all cycle time. With this operating schedule, 10 chambers would be required to give on-stream time equal to that furnished by seven chambers when utilizing parallel flow and completing regeneration in three hours.

My process is applicable to those solid adsorbent contact catalysts which are deactivated by carbonaceous deposits and which may be restored to suitable activity at conditions accompanying combustion of the carbonaceous material. Examples of such catalysts are the contact catalysts classified as clay-type and mineral ore material and natural and/or synthetic metal oxides which are active in promoting such hydrocarbon conversions as for example cracking, dehydrogenation, reforming, aromatization and desulfurization at temperatures in the range of from about 800 to about 1200° F. For catalytic cracking processes the preferred temperature range is from about 900 to about 1000° F. My process is primarily applicable to the cracking of hydrocarbons boiling above the gasoline range.

These catalysts are usually restored to substantially the original activity by the reactivation procedures described above, as long as combustion temperatures do not exceed 1300 to 1500° F. The lower temperature limits for reactivating gases are ordinarily in the range of 800 to 900° F., depending on the pressure and the amount of combustible deposits. Pressures in the reactivation operation are usually low superatmospheric pressures of 15 to 100 pounds gage, depending on the means available for supplying the reactivating gases. Pressures of 30 to 50 pounds gage are often preferred, since the volume of gas handled and the reactivation time are both reduced by higher pressures.

As the combustible deposits are progressively removed from the catalyst granules, both the temperature and the combustion rate will decrease, and it may prove desirable to increase the oxygen concentration of the reactivating gas during the final stages or reactivation in order to maintain the combustion rate. Such adjustments and control devices which are contemplated as a part of conventional reactivation procedure are easily accomplished by the arrangement of equipment and the method of operation described herein.

I claim:

1. In a process of hydrocarbon conversion over a solid adsorbent contact catalyst which is progressively deactivated by carbonaceous residues deposited thereon during said conversion, the steps comprising passing hydrocarbon vapors at conversion temperature through the total depth of a catalyst zone comprising a series of at least two catalyst beds of unequal volume, said beds being separated by a free space, and said beds being of such relative volumes that substantially equal weights of combustible material are deposted therein during on-stream operation, and regenerating said catalyst by simultaneously flowing independent streams of regenerating gas through said beds in parallel, the space velocity of regeneration gas being substantially greater through the catalyst bed having the smaller volume and the higher carbon concentration than through the other bed.

2. In a process of hydrocarbon conversion over a solid adsorbent contact catalyst which is progressively deactivated by carbonaceous residues deposited thereon during said conversion, the steps comprising passing hydrocarbon vapors at conversion temperature through the total depth of a catalyst zone comprising a series of two catalyst beds of unequal volume, said beds being separated by a free space, and said beds being of such relative volumes that substantially equal weights of combustible material are deposited therein during on-stream operation, and regenerating said catalyst by passing independent streams of regenerating gas simultaneously and in parallel to said catalyst beds, the stream passed to the larger catalyst bed having the lower carbon concentration being of substantially higher oxygen concentration than to the other catalyst bed.

3. A method of conducting the catalytic conversion of hydrocarbons over solid adsorbent contact catalysts which are progressively deactivated by carbonaceous residues deposited thereon during said conversion, which comprises the passage of hydrocarbon vapors at conversion temperature into one end of an elongated vertical catalyst chamber containing a series of at least two beds of catalysts of unequal volumes separated by free spaces and vertically disposed in the path of said vapors said beds being of such relative volumes that substantially equal weights of combustible material are deposited thereon during said conversion, removing the treated vapors at the opposite end of said chamber after series flow through the multiple catalyst beds, and periodically reactivating the catalyst in said chamber through combustion of the carbonaceous residues by stopping the flow of hydrocarbon vapors, purging residual hydrocarbons from the catalyst, passing oxygen-containing gas simultaneously into both ends of the catalyst chamber while removing the combined gas streams and combustion products through an intermediate outlet line along the vertical chamber axis located opposite a free space between beds of catalyst whereby parallel flow of reactivating gas is obtained through the catalyst beds between each end of the chamber and the said outlet line, and subsequently purging oxygen-containing gas from the chamber and resuming the hydrocarbon conversion.

4. A method for the catalytic conversion of hydrocarbons over solid adsorbent contact catalysts which are progressively deactivated by the deposition of carbonaceous residues thereon during said conversion, which comprises flowing said hydrocarbon vapors under conversion conditions successively through a pair of catalyst beds spaced from each other and defining a free-space therebetween until said catalyst beds are substantially deactivated, then separately reactivating each of said beds by simultaneously introducing separate streams of oxygen-containing reactivating gas under combustion conditions into each of said beds at opposite ends thereof and flowing same in opposite directions toward said free space while separately controlling the amount, flow rate, temperature and oxygen content of each of said streams in accordance with the depth and carbonaceous content of each of said beds to effectuate said reactivation simultaneously and in the same time period, thereby preventing disarrangement of said catalyst and permitting uniform combustion by the back-pressure in said free-space caused by said gas streams flowing in opposite directions, and withdrawing a combined stream of spent reactivation gases from said free-space.

5. The method of claim 4 in which said catalyst beds are of equal volume.

6. The method of claim 4 in which said catalyst beds are of unequal volume.

WALTER A. SCHULZE.